US006529944B1

United States Patent
LeCrone

(10) Patent No.: US 6,529,944 B1
(45) Date of Patent: Mar. 4, 2003

(54) HOST SYSTEM FOR REMOTE CONTROL OF MASS STORAGE VOLUMES USING CASCADING COMMANDS

(75) Inventor: Douglas LeCrone, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/225,461

(22) Filed: Jan. 6, 1999

(51) Int. Cl.[7] .............................................. G06F 15/16
(52) U.S. Cl. ...................... 709/211; 707/10; 707/202; 707/204; 707/205; 711/159; 711/162
(58) Field of Search ............................ 709/211; 707/10, 707/204, 202, 205; 711/162, 159

(56) References Cited

U.S. PATENT DOCUMENTS

| | | | | |
|---|---|---|---|---|
| 4,156,907 A | * | 5/1979 | Rawlings et al. | 709/212 |
| 4,688,171 A | * | 8/1987 | Selim et al. | 709/208 |
| 4,747,047 A | * | 5/1988 | Coogan et al. | 710/38 |
| 5,566,331 A | * | 10/1996 | Irwin, Jr. et al. | 707/10 |
| 5,852,718 A | * | 12/1998 | Loo | 709/208 |
| 6,000,825 A | * | 12/1999 | Fredriksson | 364/138 |
| 6,101,497 A | * | 8/2000 | Ofek | 707/10 |
| 6,112,229 A | * | 8/2000 | Hardy et al. | 709/206 |
| 6,148,382 A | * | 11/2000 | Bitner et al. | 711/162 |
| 6,161,111 A | * | 12/2000 | Mutalik et al. | 707/205 |
| 6,202,135 B1 | * | 3/2001 | Kedem et al. | 711/162 |

\* cited by examiner

Primary Examiner—Ayaz Sheikh
Assistant Examiner—Frantz B. Jean
(74) Attorney, Agent, or Firm—John M. Gunther; Penelope S. Wilson

(57) ABSTRACT

A host system for remote control of mass storage volumes using cascading commands which collect information about linked remote volumes located in physically separate sites so other cascading commands can be issued to effect changes in linked remote volumes. A host computer program issues the cascading commands which ask the locally communicating mass storage system to return information which can be used to identify one or more levels of remote mass storage systems in a stream of remote mass storage systems. Once a mass storage system at a given level has been identified, commands can be sent by the host through the locally communicating mass storage system to cause actions to occur at the identified remote level, whether or not there are multiple intervening levels of remote mass storage systems. In one embodiment, a host computer can query, establish, split, re-establish, copy, restore, reverse split, differentially split and reverse differentially split business continuance volumes at any level in a stream of local and remote mass storage system sites.

20 Claims, 17 Drawing Sheets

*Fig. 4a*

```
QUERY seq#,RMT(cuu[,ragrp][,ragrp[,.. .]) [,ALL|,count]
```

*Fig. 4b*

```
ESTABLISH  seq#,RMT(cuu,sym#bcv,sym#std[,ragrp][,ragrp][,.. .])
[,WAIT|,NOWAIT] [,GROUP =]
```

*Fig 4c*

```
RE-Establish seq#, RMT(cuu,sym#bcv[,ragrp][,ragrp][,.. .])
[,WAIT|,NOWAIT][,GROUP =]
```

*Fig. 4d*

```
SPLIT seq#,RMT(cuu,sym#bcv[,ragrp][,ragrp][,.. .])[,WAIT|,NOWAIT]
[,GROUP =]
```

*Fig. 4e*

```
RESTORE seq#,RMT(cuu,sym#bcv[,ragrp][,ragrp]
[,...])[,WAIT|,NOWAIT] [,GROUP =]
```

Fig. 6a Host System View of Volumes
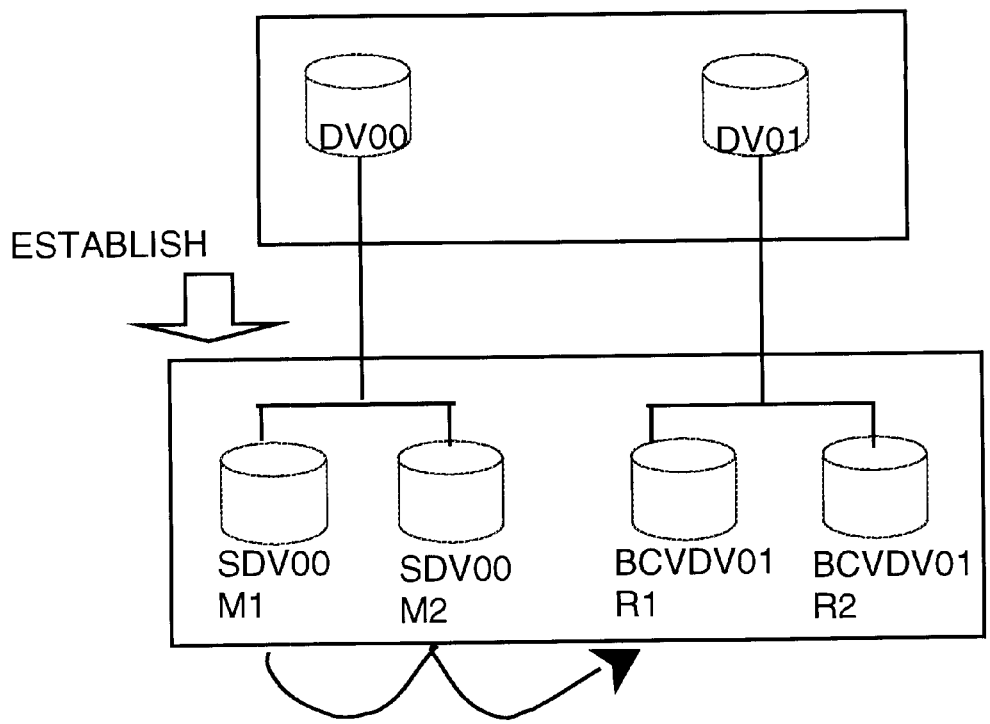
Fig. 6b Host System View of Volumes
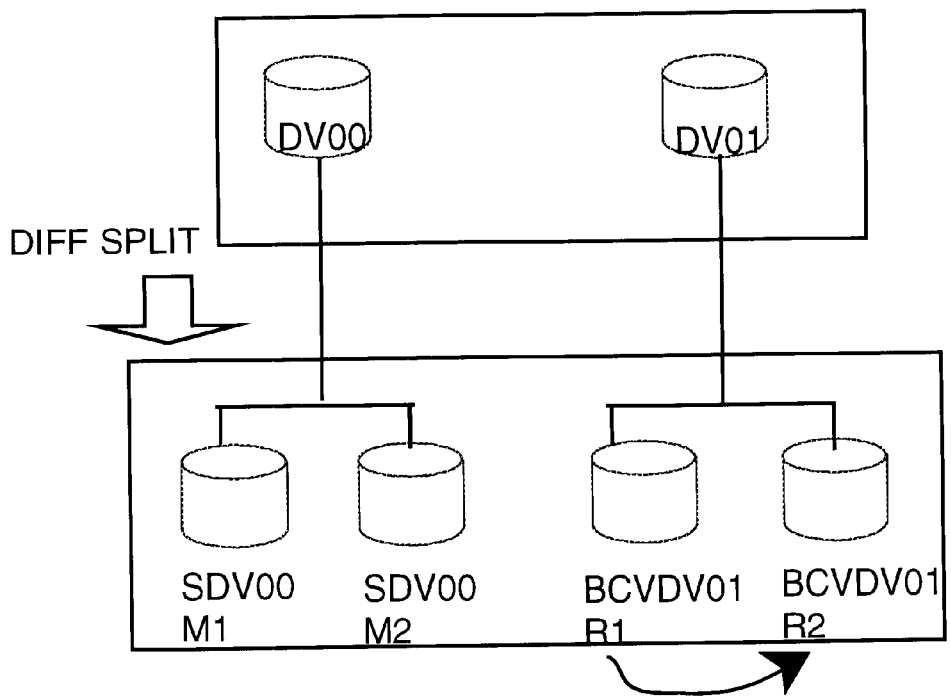

Fig. 7d (Prior Art))
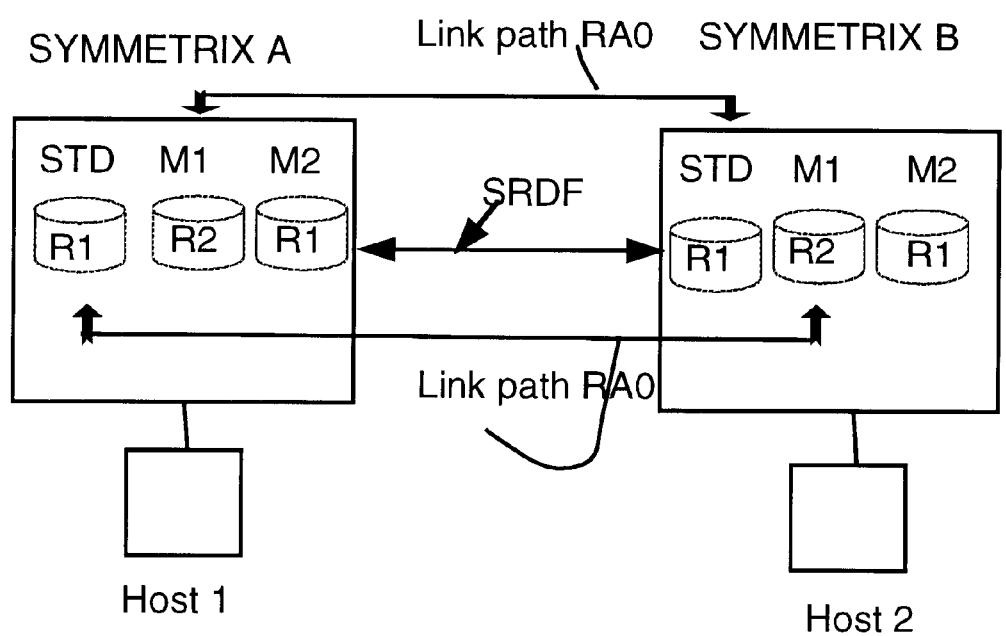

Fig. 16

Table

| | Addr | Source | Target | RAGRP |
|---|---|---|---|---|
| Line1 | 1 | R1-26 | R2-19 | 0 |
| Line2 | 1 | R1-27 | R2-18 | 1 |

HOST SYSTEM FOR REMOTE CONTROL OF MASS STORAGE VOLUMES USING CASCADING COMMANDS

BACKGROUND OF THE INVENTION

1. Field of the Invention

This invention relates generally to the field of mechanisms for allowing remote control to occur between host computers and a plurality of mass storage business continuance volumes and more particularly to cascading commands for issuance by a host system to collect information about and transmit control commands to volumes at one or more levels away from the host in the system.

2. Background

Mass storage systems have become increasingly cost effective for critical business systems. Advances such as Redundant Arrays of Independent Disks (RAID) technologies and Hierarchical Storage Management (HSM) systems have greatly improved the reliability of mass storage by providing a number of different redundancy features. Additionally, HSM systems such as the SYMMETRIX™ systems that are commercially available from the Assignee of the subject application provide disaster recovery facilities such as Symmetrix Remote Data Facilities (SFDF). These allow a SYMMETRIX™ 5xxx system located at one site to maintain a continuous copy or mirror of the data at the logical volume level in other SYMMETRIX™ systems located in physically separate sites. FIG. 7a (Prior Art) illustrates a redundancy technique used in SYMMETRIX™ systems to provide mirroring, RAID configurations, and other forms of redundant disk storage. As seen in FIG. 7a (Prior Art) disk adapters DA1, DA2 and DA3 are connected over small computer storage interface (SCSI) buses to physical disk drives C, such as C1, C2 and C3 on disk adapter DA1. In SYMMETRIX™ systems, in some implementations, a physical disk C1 is divided into three logical disks, called H1, H2, and H3.

To illustrate this, assume a typical physical disk connected to a mainframe computer contains 2000 cylinders. In an HSM system such as SYMMETRIX™ systems, shown in FIG. 7a (Prior Art) using disks C which are larger in capacity than the typical disks, the larger disks C can be logically divided into smaller logical units. If the disks C in this example hold 6000 cylinders, this physical disk C has the capacity of three typical disks. Each logical disk H, in this example, would be the equivalent of one typical disk.

Still in FIG. 7a (Prior Art), if a typical disk contains a single large file or dataset named DSN1, mirroring redundancy techniques used in an HSM such as SYMMETRIX™ systems, can create copies of this dataset DSN1 on disk adapters DA2 and DA3. In the example here, the first standard copy of DSN1 is physically located on disk adapter DA1, disk C1, at logical disk H2. The first mirror copy, DSN1M1 is located physically on disk adapter DA2, at physical disk C2, logical disk H1. The second mirror copy DSN1M2 is located on disk adapter DA3, physical disk C3, logical disk H3.

In FIG. 7b (Prior Art), a more abstract way of thinking about mirroring or redundancy is shown. If the HSM system allows three mirrors for a standard disk, the HSM might have disks configured as shown here—the standard disk for data DSN1, is allocated to disk adapter DA1, physical disk C1. The first mirror, Mirror1, is assigned to disk adapter DA2, physical disk C3, and so on. In SYMMETRIX™ systems, the combination of disk adapter DA, physical disk C and logical disk H, is resolved into a SYMMETRIX™ device number. In this example, the SYMMETRIX™ system synchronizes the mirrors in a transparent manner. When the data from disk adapter DA1, physical disk C1 has been copied to mirror1 and mirror 2, the devices are considered synchronized.

Now turning to FIG. 7c (Prior Art), disk adapters DA are shown as they might be configured in Symmetrix Remote Data Facilities (SRDF) systems for disaster recovery. As seen in FIG. 7C (Prior Art), a SYMMETRIX A(MASTER) system has been configured in a unidirectional SRDF campus solution with SYMMETRIX B(SLAVE) system.

When the SRDF features are used, a SYMMETRIX™ system includes not only cache memory, channel directors CD and disk adapters DA, but remote link directors RLD. Within each SYMMETRIX™ unit, three volume types may be defined: local (L), source (R1) and target (R2). Local volumes L are volumes unique to that SYMMETRIX™ unit. They are only accessible to hosts attached to that SYMMETRIX™ unit (in this example, HOST 1.)

Still in FIG. 7c (Prior Art), source volumes R1 are logical volumes that reside on a SYMMETRIX™ unit with the SRDF features activated, so that the data on source volumes R1 is mirrored or copied to respective target volumes R2 on another SYMMETRIX™ unit (in this example, HOST 2). The target volumes R2 are located on one or more separate SYMMETRIX™ units in an SRDF configuration.

As seen in FIG. 7c (Prior Art), a path is established by the remote link directors RLD to allow data to be mirrored. The paths shown here are labeled remote access group 0, or RA0.

Turning now to FIG. 7d (Prior Art), a bidirectional SRDF configuration is shown. Host 1 is logically in communication with standard volume std, in this example. As mentioned above, SYMMETRIX™ systems would normally (in the absence of SRDF features) establish some mirroring for an ordinary volume. In this case, mirrors M1 and M2 in SYMMETRIX™ A might be established for standard volume std. The SRDF feature takes this mirroring one step further. Instead of creating a mirror of SRDF standard source volume R1 on SYMMETRIX™ A, the SRDF features, using the remote link directors RLD, assign a remote mirror M1 in SYMMETRIX™ B. In other words, source volumes R1 are standard volumes that reside on a SYMMETRIX™ unit, with the data on those volumes mirrored to respective target R2 volumes on another SYMMETRIX™ unit, here SYMMETRIX™ B. If the source volume R1 fails, the SYMMETRIX™ A will transparently access the data on the corresponding target volume R2 in SYMMETRIX™ B. When the failing volume is replaced, the remotely mirrored pair is re-synchronized automatically as a background operation, using the data in the target volume R2.

Still in FIG. 7d (Prior Art), target R2 volumes are a copy of the source R1 volumes in another SYMMETRIX™ unit. A target volume R2, typically has a default configuration mode of "read-only" to any host with access to the SYMMETRIX™ unit in which it resides. In this example, mirror M1, in SYMMETRIX™ B, which is the remote mirror to the source volume R1 in SYMMETRIX™ A, would be made "not-ready'" to Host 2. Normally, writes to the target volume R2 on Host 2, occur via the link paths created by the remote link director. However, if the source volume R1 on SYMMETRIX™ A fails, SYMMETRIX™ A will transparently access the data on its corresponding target R2 volume (here, M1 in SYMMETRIX™ B)

A target volume R2 typically has a default configuration mode of "read-only" to any host with access to its SYM- METRIX™ unit, in this example, HOST 2. To enable disaster recovery, the remote link directors RLD in a SYMMETRIX™ unit, create link paths RA0 with the SYMMETRIX™ unit containing the target volumes R2. As data is written to a source volume R1 by HOST 1, the remote link director RLD in SYMMETRIX™ A automatically writes a copy of that data over link path RA0 of the SRDF connection to the corresponding target volume R2 on the designated SYMMETRIX B system. Thus, if a source volume R1 fails for any reason, the remote link director RLD will transparently access the data on the corresponding target volume R2 on the designated target SYMMETRIX B system over the link paths RA0 and transmit that to HOST 1.

New writes to the failed source volume R1 in SYMMETRIX™ A accumulate as invalid tracks in the cache of SYMMETRIX™ A—the unit containing the source volume R1. When the failing source volume R1 is replaced, the remotely mirrored pair is re-synchronized automatically as a background operation within the SYMMETRIX™ unit, using the data in the appropriate target volume R2.

FIG. 8 (Prior Art) shows an extended distance implementation of the SRDF features. So far, the above discussion dealt primarily with an SRDF CAMPUS connection, which usually involves physical proximity, such as units located in two buildings on a college campus. In extended distance configuration shown in FIG. 8 (Prior Art), the source volume R1 on SYMMETRIX™ unit SYMMETRIX A is being automatically and transparently copied to target volume R2 on SYMMETRIX C over the SRDF EXTENDED DISTANCE connection. The SRDF EXTENDED DISTANCE solution allows source volume R1 to be automatically copied to target volume R2 on SYMMETRIX C, which may be located thousands of miles away. Thus, if a disaster such as a flood destroys all the hosts and SYMMETRIX™ units located at a campus site, the application can still be run from the remote, extended distance site represented here by SYMMETRIX C. Sites can be as much as 37.5 miles (60 km) apart from each other in a "campus" solution, or in an extended distance solution over 37.5 miles (60 km) apart using T3 or E3 or similar high speed links.

These disaster recovery remote sites, whether campus or extended ones, are mirrors or copies of data stored on the SYMMETRIX™ systems physically located near the host computer. As described above, the copying is done by the respective SYMMETRIX™ systems automatically, once all appropriate SYMMETRIX™ systems have been configured for the SRDF feature. This means the host(s) and local SYMMETRIX™ systems at each site are able to operate as efficiently as if the remote copying were not occurring. That is, the continuous copying to the remote sites is not "logically visible" to the host computers at the various sites, nor does it interfere with processing at the host. Hence, a host computer, is not able to send commands that effect changes to the remote sites. This is true even if the remote sites are located only one step away in a campus solution. If the host wishes to effect changes, either the CAMPUS or the extended sites, there was heretofore no way of doing this directly at the local site.

It is an object of this invention to enable a host computer to cause volumes to be managed remotely.

It is another object of the present invention to enable a host computer to issue commands to effect changes in volumes at remote SRDF sites.

Still another object of the present invention is to enable a host computer to collect information about volumes at remote SRDF sites.

SUMMARY OF THE INVENTION

These and other objects are achieved by a host system for remote control of mass storage volumes using cascading commands which collect information indirectly about a stream of linked volumes attached to mass storage volumes attached to other hosts or located at physically separate sites. A host computer program issues the cascading commands which ask the locally communicating mass storage system to return information which can be used to identify one or more levels of remote mass storage systems. Once a mass storage system at a given level has been identified, commands can be sent by the host through the locally communicating mass storage system to cause actions to occur at the identified remote level, whether or not there are multiple intervening levels of remote mass storage systems. In the embodiment shown, a host computer can query, establish, split, re-establish, copy and restore business continuance volumes at any level in a chain of local and remote mass storage system sites. Those skilled in the art will appreciate that other commands could be implemented as well to effect changes in the volumes at remote sites.

It is an aspect of the present invention that it enables host commands to cascade over one or more intervening levels of mass storage systems at remote sites to take effect at a particular designated site.

Still another aspect of the present invention is that it enables a host to monitor the operations being controlled at the designated remote site.

Still another aspect of the present invention is that it can significantly improve the remote site's ability to be effective as a business continuance site for disaster recovery.

BRIEF DESCRIPTION OF THE DRAWINGS

FIGS. 4a–4e block diagrams of the syntax of cascading remote business continuance volume commands of the present invention.

FIG. 6a is a block diagram of an establish command using the cascading commands of the present invention.

FIG. 6b is a block diagram of a differential split command using the cascading commands of the present invention.

FIG. 16 is an illustrative table used with the present invention.

DETAILED DESCRIPTION OF THE INVENTION

Figure 1:
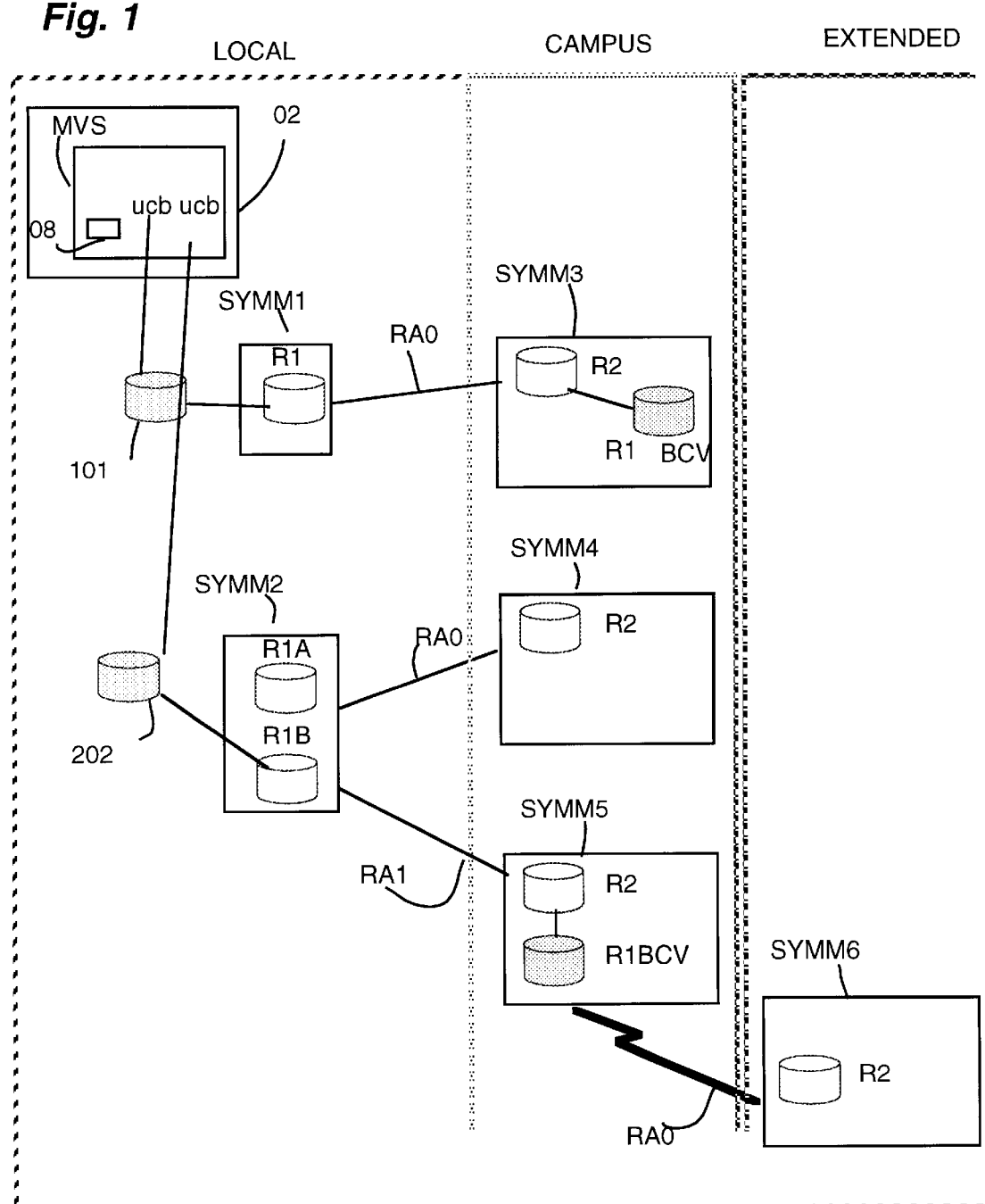
FIG. 1 is a block diagram of the present invention.

In FIG. 1, a block diagram of the present invention is shown. In this example, a host computer system, host 02, is executing an operating system MVS, which is IBM Corporation's MVS operating system. Those skilled in the art appreciate other operating systems for a host, such as UNIX or MICROSOFT's NT™ operating systems could be used, among others. Host component software 08 allows a user to cascade commands from host 02 to a SYMMETRIX™ system such as SYMM2, at the LOCAL site, to SYMMETRIX™ SYMM5 at the CAMPUS site to SYMMETRIX™ system SYMM6 at an EXTENDED site.

Still in FIG. 1, commands can be issued from host 02, SYMM2 to take effect at SYMM5 and SYMM6, for example, by establishing a BCV volume (R1BCV) in SYMM5, which causes the contents of standard volume R2 in SYMM5 (which are actually the contents of R1B in SYMM2) to be copied to R1BCV. When the R1BCV volume is subsequently split off, it becomes a source volume R1BCV in SYMM5 to target volume R2 in SYMM6. Thus, the contents of disk R1B, in SYMM2 at the LOCAL site, have been propagated to disk R2 in SYMM6 at an EXTENDED DISTANCE location possibly thousands of miles away. All of the copying needed to effect this is transparent to each of the hosts at each site. In this example, the contents of disk R2 on SYMM6 at the EXTENDED location can serve as a disaster recovery backup, as of a certain time and date, for the business applications running on host 02.

Figure 9:
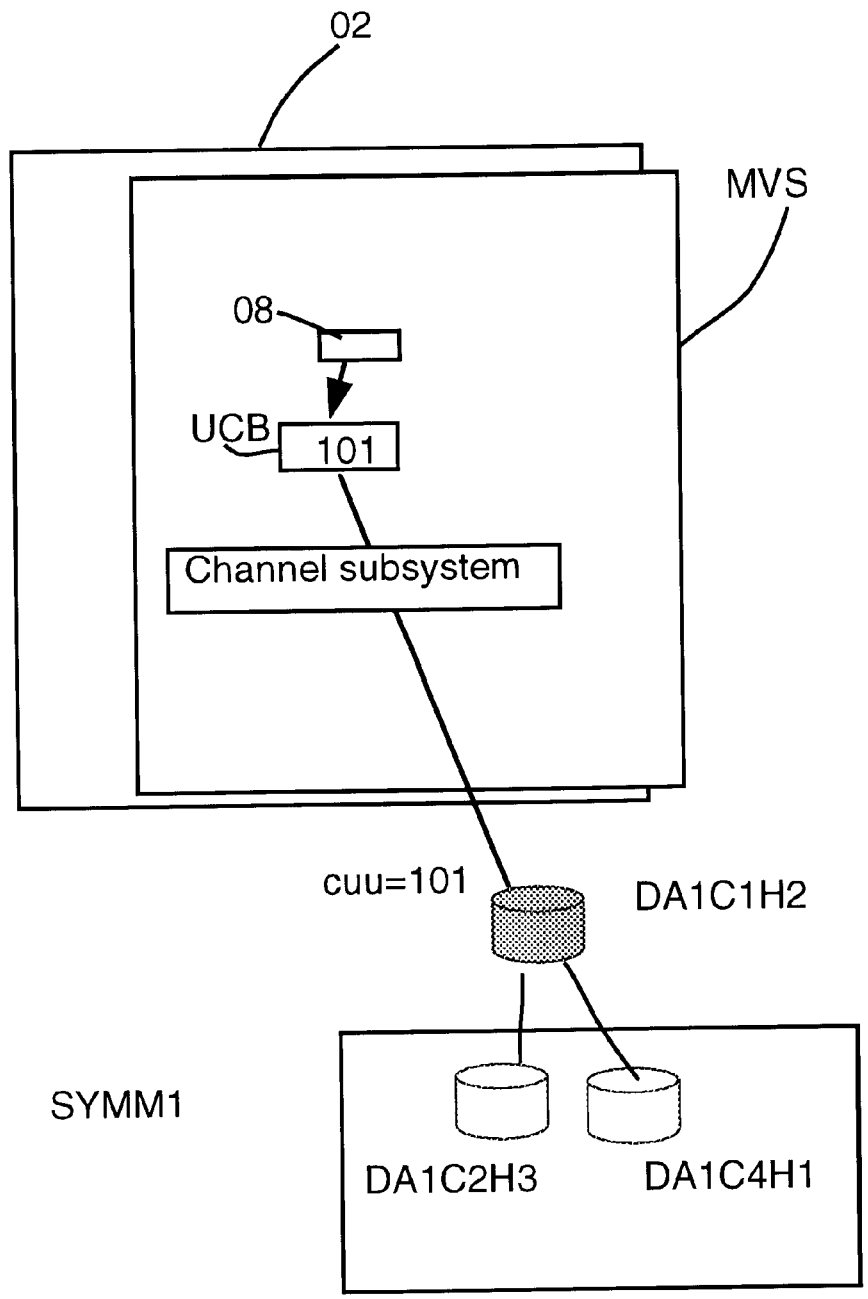
FIG. 9 is a block diagram of the logical flow of data between a host operating system and mass storage subsystems.

Turning briefly to FIG. 9, an overview of the interface between host software 08 and a SYMMETRIX™ system SYMM1 is shown. Host 02 is connected to mass storage subsystem SYMM1. In the MVS environment, the operating system software MVS links computer programs to physical devices by means of a unit control block, UCB, which, in turn, maps into the MVS operating system's channel subsystem. The channel subsystem takes logical input/output requests and maps them into channel path selections to a particular device and ultimately, physical input/output signals for that device. The logic inside a SYMMETRIX™ system does the final mapping which assigns the logical device to one or more mirrors and identifies the SYMMETRIX™ device numbers for each device and mirror involved, in this case, DA1C1H2, and DA1C2H3 and DA1C4H1. Those skilled in the art will appreciate that other operating systems have similar mechanisms for separating the logical input/output requirements from the physical as this enables much more flexibility for configuring the hardware.

U.S. patent application Ser. No. 08/842,953 filed Apr. 25$^{th}$, 1997, issued as U.S. Pat. No. 6,101,497 on Aug. 8$^{th}$, 2000, entitled "Method and Apparatus for Independent and Simultaneous Access to a Common Data Set", ("953") which assigned to the Assignee of the subject application, and is also hereby incorporated by reference, generally describes a way to further enhance SYMMETRIX™ systems by allowing the establishment of what are known as Business Continuance Volumes (BCV) in a SYMMETRIX™ system. In addition, co-pending U.S. patent application Ser. No. 09/039,020, filed Mar. 13, 1998, entitled "Host System for Mass Storage Business Continuance Volumes" ("020") which is assigned to the Assignee of the subject application and is also hereby incorporated by reference, generally describes a system for enabling a host computer, using an operating system such as MVS, to find the time to establish and manage such business continuance volumes in a local SYMMETRIX™ system without disrupting critical business programs.

Figure 10:
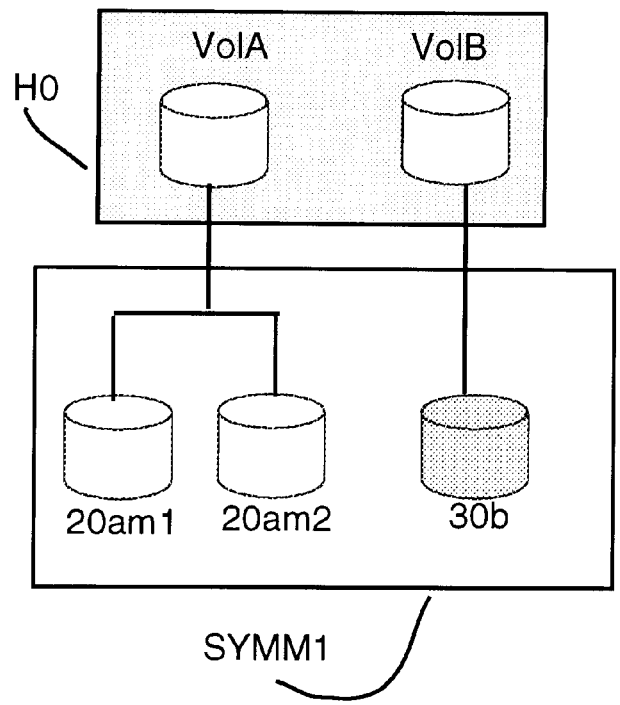
FIG. 10 is a block diagram of simple mirroring in a mass storage subsystem.

Since the establishment of Business Continuance Volumes (BCV), as generally described in application 020, makes use of ordinary mirroring capabilities found in SYMMETRIX™ units and similar HSM systems, simple mirroring is illustrated at FIG. 10.

In FIG. 10, the logical volumes as the host sees them are shown in the box labeled H0. In this and the next few Figures, the host recognizes two logical volumes by the volume serial numbers VolA and VolB. Mass storage subsystem SYMM1 actually stores the data for these volumes on its own logical volumes. Here, mirroing has been configured for the data on a logical SYMMETRIX™ volume with a volume serial number of VolA. Mass storage subsystem SYMM1 assigns this logical volume to logical volume 20am1. To create a mirror disk for it, it assigns another logical volume 20am2. Mass storage subsystem SYMM1 maintains logical volumes 20am1 and 20am2 as mirror copies of each other, but host H0 and the MVS operating system work with logical volume serial VolA as though it were the only logical volume in use.

Next, as generally described in co-pending application 020, SYMM1 uses the same mirroring techniques to establish a business continuance volume BCV 30b. Any mirror structure can be used, such as normal mirroring, RAID, mirroring with the Assignee's Symmetrix Remote Data Facilities (SRDF), and so on.

Figure 11:
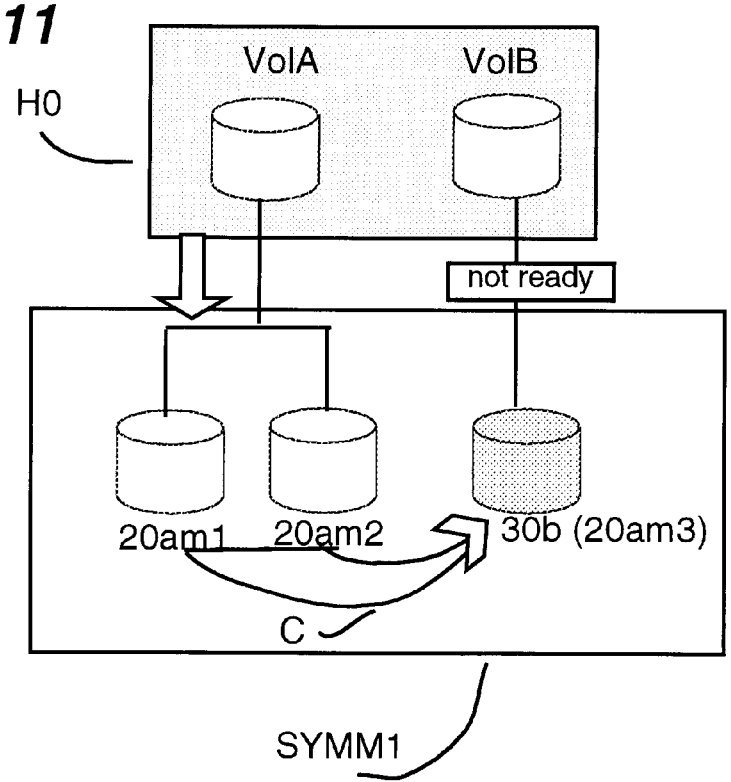
FIG. 11 is a block diagram of a mass storage subsystem in which a local business continuance volume is being established.

The establishment of a BCV volume, using the ESTABLISH BCV command is shown in FIG. 11. Host component software causes mass storage subsystem SYMM1 to set logical volume 30b as "not ready" to host H0 (and any other hosts H connected to mass storage subsystem SYMM1.) Mass storage subsystem SYMM1 then assigns BCV volume 30b as the next available mirror for standard volume mirrors 20am1 and 20am2. This assignment of the BCV volume to mirror status enables mass storage subsystem SYMM1 to copy the contents of standard mirror volumes 20am1 and 20am2 to BCV volume 30b (20am3) as shown by the arrow C in FIG. 11. While the copying is taking place, it is transparent to the host, which may continue to make I/O requests to logical volume VolA. For better performance, half the data is copied to BCV volume 30*b* from disk 20*am*1 and the other half from disk 20*am*2.

Figure 12A:
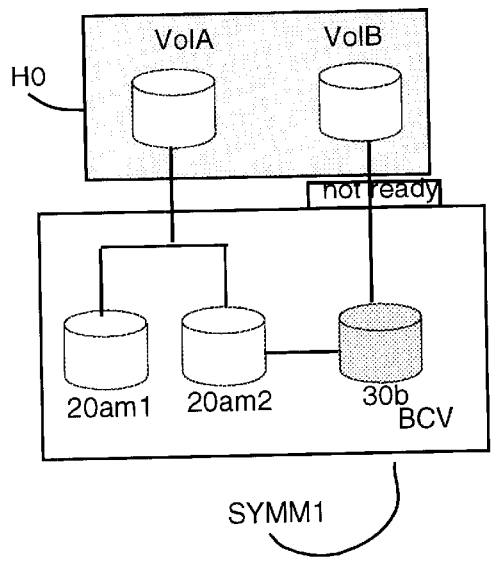
FIG. 12a is a block diagram of a mass storage subsystem in which a local business continuance volume has been established.

Now as is shown in FIG. 12*a*, when the copying is complete and BCV volume 30*b*(20*am*3)'s contents are identical to those of standard volume 20*am*1 and 20*am*2, BCV volume 30*b* (20*am*3) is now synchronized with standard volumes 20*am*1 and 20*am*2 and capable of working as a business continuance device. This copying is transparent to, and not disruptive of the business application running on the host. Once a BCV volume has been synchronized by mass storage subsystem SYMM1, it is considered part of a BCV pair, and any new data written to the standard volume of such a pair is also written to the BCV volume of the BCV pair by mass storage subsystem SYMM1. The BCV volume will continue to be marked as "not ready" for any hosts H which use mass storage subsystem SYMM1 as long as it is a part of a BCV pair.

Figure 12B:
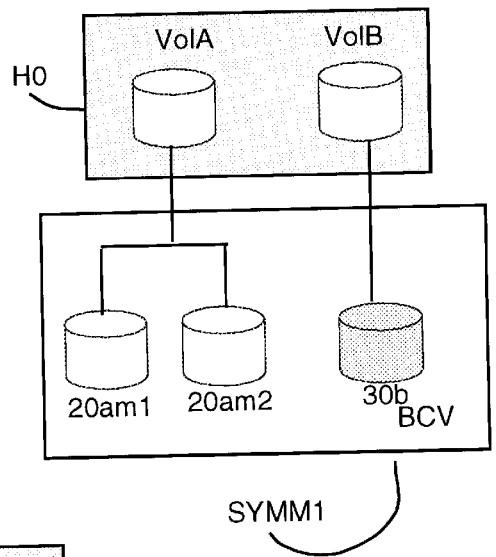
FIG. 12b is a block diagram of a mass storage subsystem in which a local business continuance volume has been split from its standard volume.

FIG. 12*b* shows the result of a split command described in application 020. The split command allows the user to stop the mirroring operation and frees up the new copy of the data for other purposes, such as testing or restore operations. The response to a split command suspends any I/O to the BCV volume 30*b* of the BCV pair, changes its device state to ready, enables access to it from any host H, while still containing the volume serial number which is the duplicate of the standard volume.The device is still offline, after the split since it was marked offline in order to originally establish or restore the volume. Mass subsystem SYMM1 flags any new writes to the standard volume that occur after the split (in case the BCV is re-established later) and resumes normal operations. New writes to the BCV volume are also flagged, after the split so that when a re-establish or incremental restore is done, as described in more detail in application 020, mass storage subsystem SYMM1 can compare the changes to both volumes and refresh the tracks that have changed.

Figure 13:
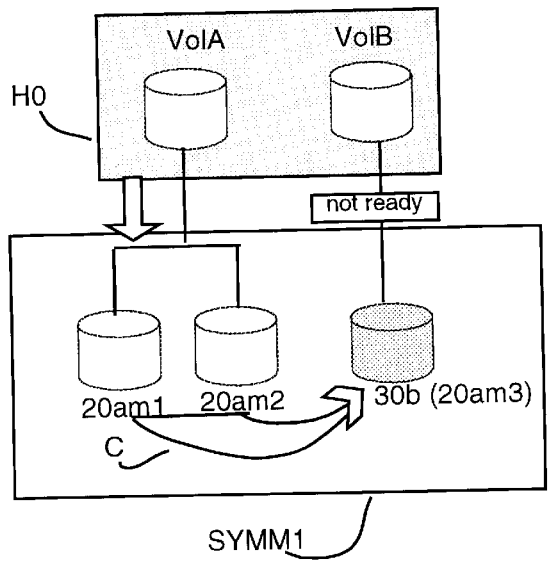
FIG. 13, is a block diagram of the re-establishment of a business continuance volume in a local system.

FIG. 13 shows the process of re-establishing a BCV pair, in which only the changes that have been made to standard volumes 20*am*1 and 20*am*2 are copied to volume 30*b*. Any tracks that had been changed on volume 30*b* as a result of its use after a split, are overwritten by the data on the corresponding track on the standard volumes.

Figure 14:
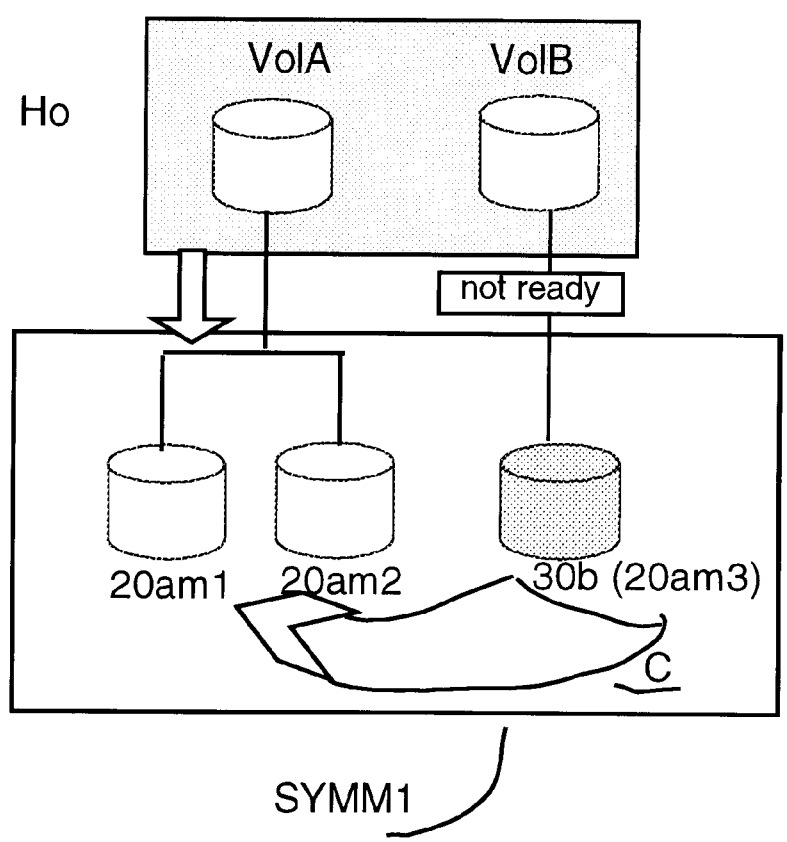
FIG. 14 is a block diagram of a restore command taking effect in a BCV volume in a local system.

FIG. 14 illustrates the restore command which restores standard volumes 20*am*1 and 20*am*2 with all the data from the BCV volume, now seen as volume 30*b*(20*am*3). A restore is done by setting the BCV volume as the next available mirror of the standard device, and copying its data to both volumes 20*am*1 and 20*am*2, overwriting the data present on those devices.

Returning to FIG. 1, when EMC Corporation's SYMMETRIX™ systems, such as SYMM1 and SYMM2, are installed locally and connected to a host, they, in effect, replace the simple physical devices known to the operating system MVS as MVS devices identified by an MVS device number cuu, which identifies an MVS device on a particular controller, with sophisticated HSM mirroring and redundancy systems. Thus, when the user is sending commands to MVS device number cuu, SYMMETRIX™ host component software 08 actually sends physical input and output signals through the operating system MVS's channel subsystem to the SYMMETRIX™ systems. In this example, MVS device number 101 might be mapped to a SYMMETRIX™ device on SYMM1, which identifies a disk adapter DA and a physical disk C.

As seen in FIG. 1, host 02 and SYMMETRIX™ systems SYMM1 and SYMM2 are physically together in a LOCAL configuration. Typically, LOCAL connections are limited to a specified area defined by cable capacities which are usually equivalent to the confines of one building or floor of a building.

Using the Assignee's SRDF remote disaster recovery features described above, a local SYMMETRIX™ system SYMM1 can be linked by SRDF, as shown in FIG. 1, to a physically separate SYMMETRIX™ system located elsewhere inside a CAMPUS. As mentioned above, CAMPUS sites are those which are within 37.5 miles of the first SYMMETRIX™ system. If the company using the mass storage systems and disaster recovery features of the SYMMETRIX™ system is a nationwide or international company, then a SYMMETRIX™ system SYMM5 at CAMPUS can also be linked to a SYMMETRIX™ system SYMM6 at an EXTENDED location, which may be thousands of miles away.

SYMMETRIX™ systems in CAMPUS and EXTENDED locations are able to communicate with each other when the SRDF link paths such as remote access groups RA0, RA1 and RA0 have been established by EMC Corporation's SRDF features. However, heretofore, a host 02, was only able to communicate with SYMMETRIX™ systems near it in location LOCAL. Commands that would have previously only been possible to send to the LOCAL SYMM1 and SYMM2 shown in FIG. 1, can now be sent to remote devices at SYMMETRIX™ systems SYMM5 and SYMM6 at CAMPUS and EXTENDED locations, using the present invention.

In the past, EMC Corporation's SRDF facility has linked such local systems SYMM1 and SYMM2 to remote sites at campuses or at extended locations, but again, with the goal of keeping all the activity transparent to hosts such as host 02. Thus, operating system MVS in host 02 of FIG. 1, including the SYMMETRIX™ systems host component software 08, would only have been aware of immediate SRDF status in its vicinity, but was unable to effect changes in the SRDF volumes and was unaware of the status of any SRDF devices downstream in the stream of linked SRDF devices and unable to effect any changes in them. In the present invention, this is changed, so that the status of devices at remote CAMPUS or EXTENDED sites, or anywhere in the stream can be determined by host 02's operating system using the SYMMETRIX™ systems host component software 08 of the present invention, and commands can be sent downstream to take effect one or two or more SRDF locations away. In effect, as seen in FIG. 1, with the present invention, commands can "skip over" or "pass through" a locally attached SYMMETRIX™ system, and a CAMPUS SYMMETRIX™ system, to take effect at an EXTENDED SYMMETRIX™ system.

Figure 5:
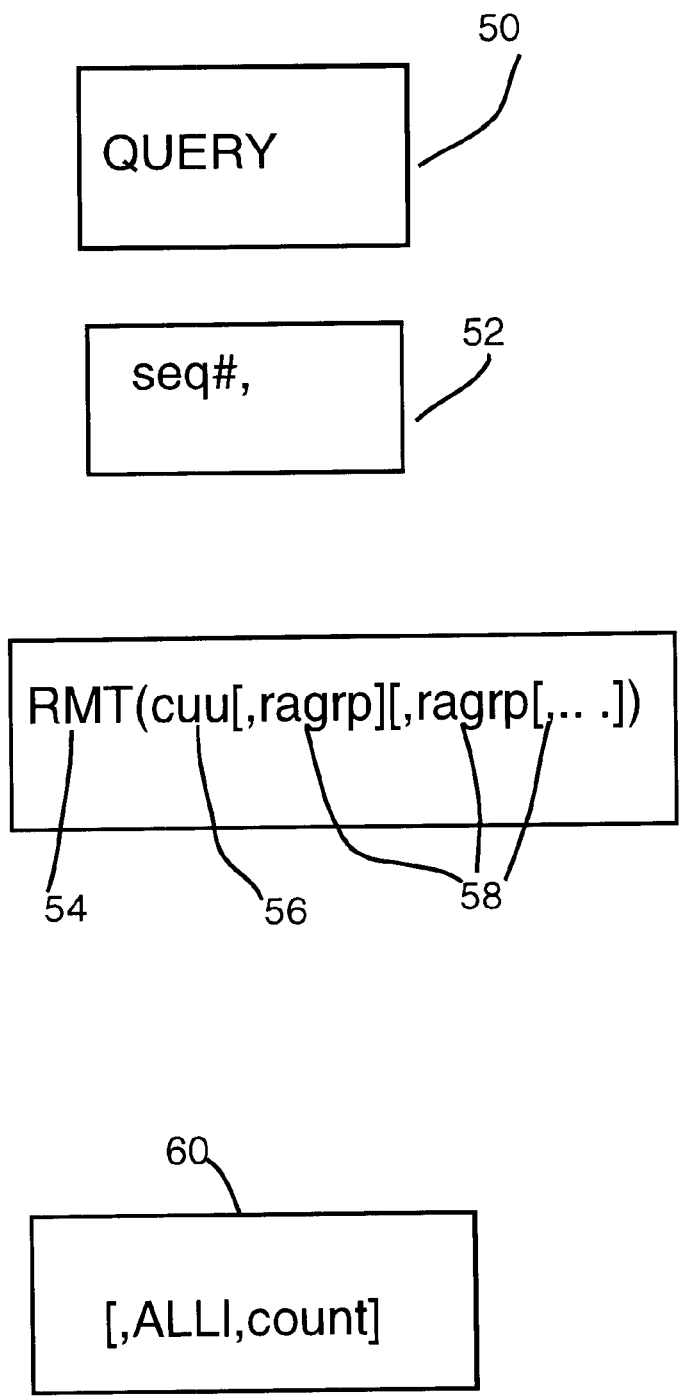
FIG. 5 is a detailed view of cascading business continuance volume command of the present invention.

Turning briefly now to FIG. 5, an illustrative command for collecting and managing information remotely is shown. In this example, a Query command 50 is issued by host component software 08 to MVS device cuu. The sequence number parameter functions as described in the above-referenced co-pending 020 patent application (a sequence number can be a decimal number from 1 to 128 which indicates in what order the specified command is to be executed. All actions on the same sequence level are executed in parallel.) The remote features of this command are shown at RMT 54, cuu 56 and ragrp 58. RMT 54 parameter specifies that the query is to gather information on the remote devices in an SRDF disaster recovery configuration. Ragrp 58 specifies the RA group through which the user wishes to perform a remote operation. For a remote command, where a remote access group (ragrp), has not been specified, the cuu 56 parameter is interpreted by SYMMETRIX™ systems to refer to source devices (known as R1 devices) for SRDF functions. Where a remote access group ragrp 58 is known, this access group can be specified. As seen here in FIG. 5, by the syntax of the command, the ragrp 58 operand is optional and can be positional. Thus, if the user wished to query the status of R2BCV volume in SYMM6, of FIG. 1, such a query might appear as:

Query 1,RMT (202,1, 0,ALL), where cuu is MVS device number 202 in SYMM2, 1 refers to ragrp RA1 between SYMM2 and SYMM5, and 0 refers to ragrp RA0 between SYMM5 and SYMM6.

Figure 7A:
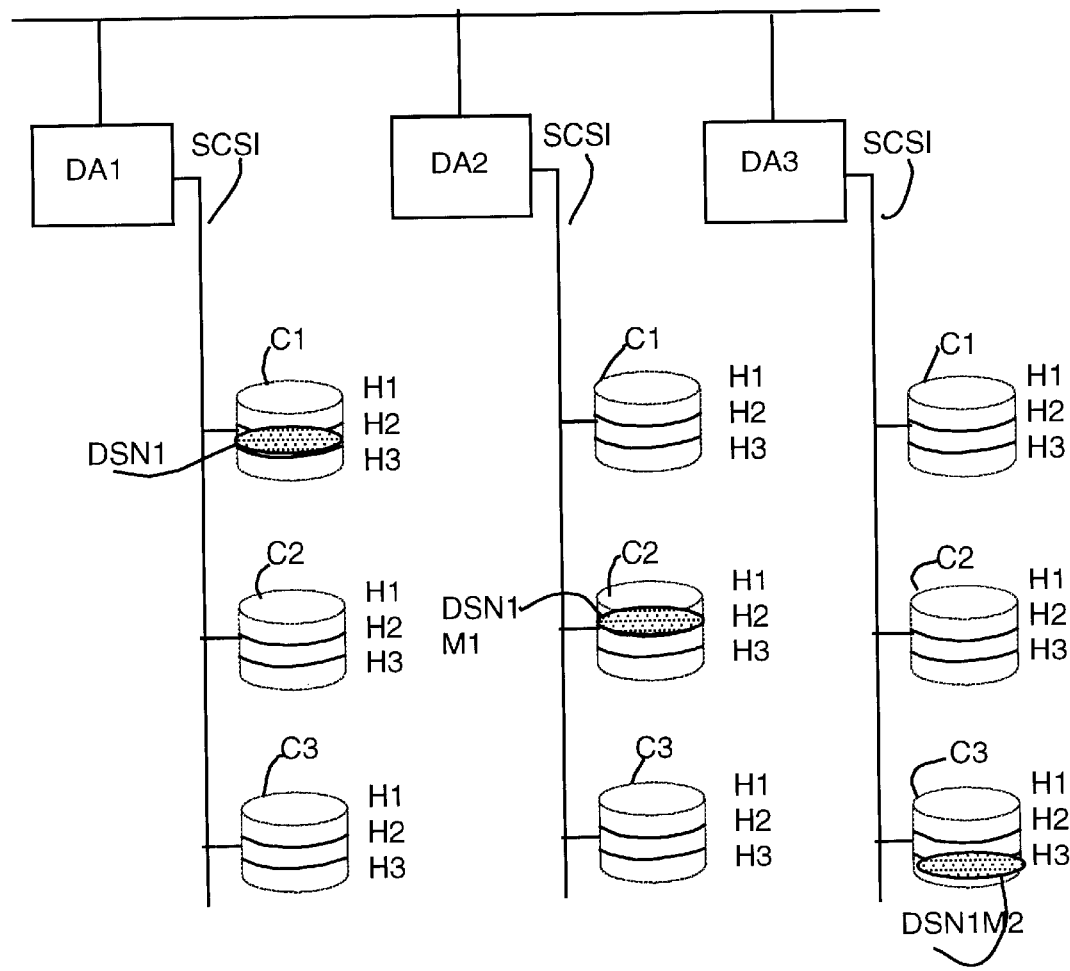
FIG. 7a (Prior Art) is a block diagram of the physical and logical disk structures of an HSM system.
Figure 7B:
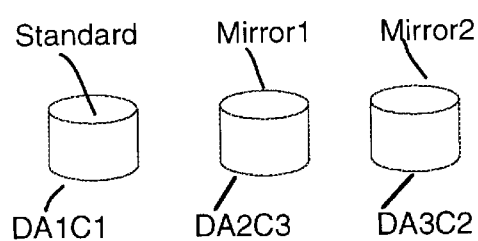
FIG. 7b (Prior Art) is a block diagram of disk mirroring.
Figure 7:
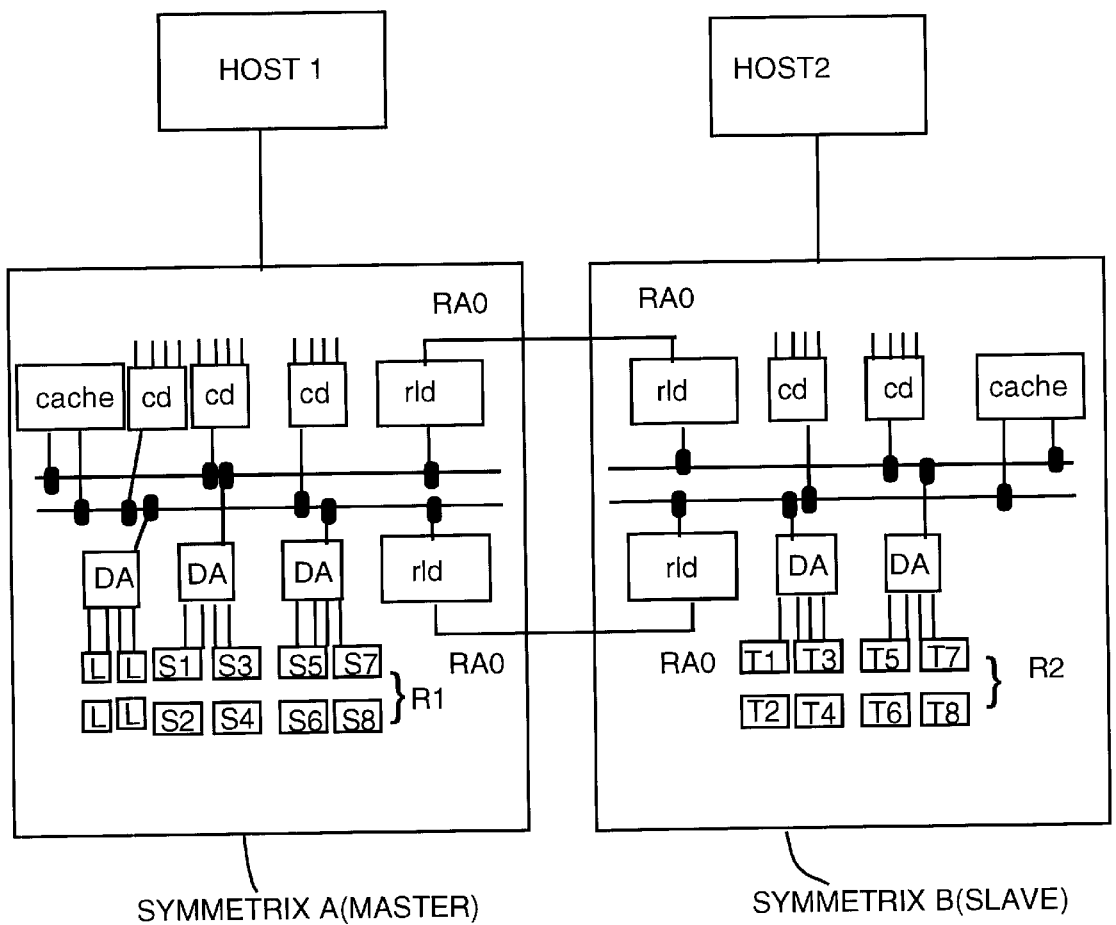
FIG. 7c (Prior Art) is a block diagram of disaster recovery features linking two physically separate sites.
FIG. 7d (Prior Art) is a block diagram of remote disk mirroring using SYMMETRIX™ SRDF features.
Figure 8:
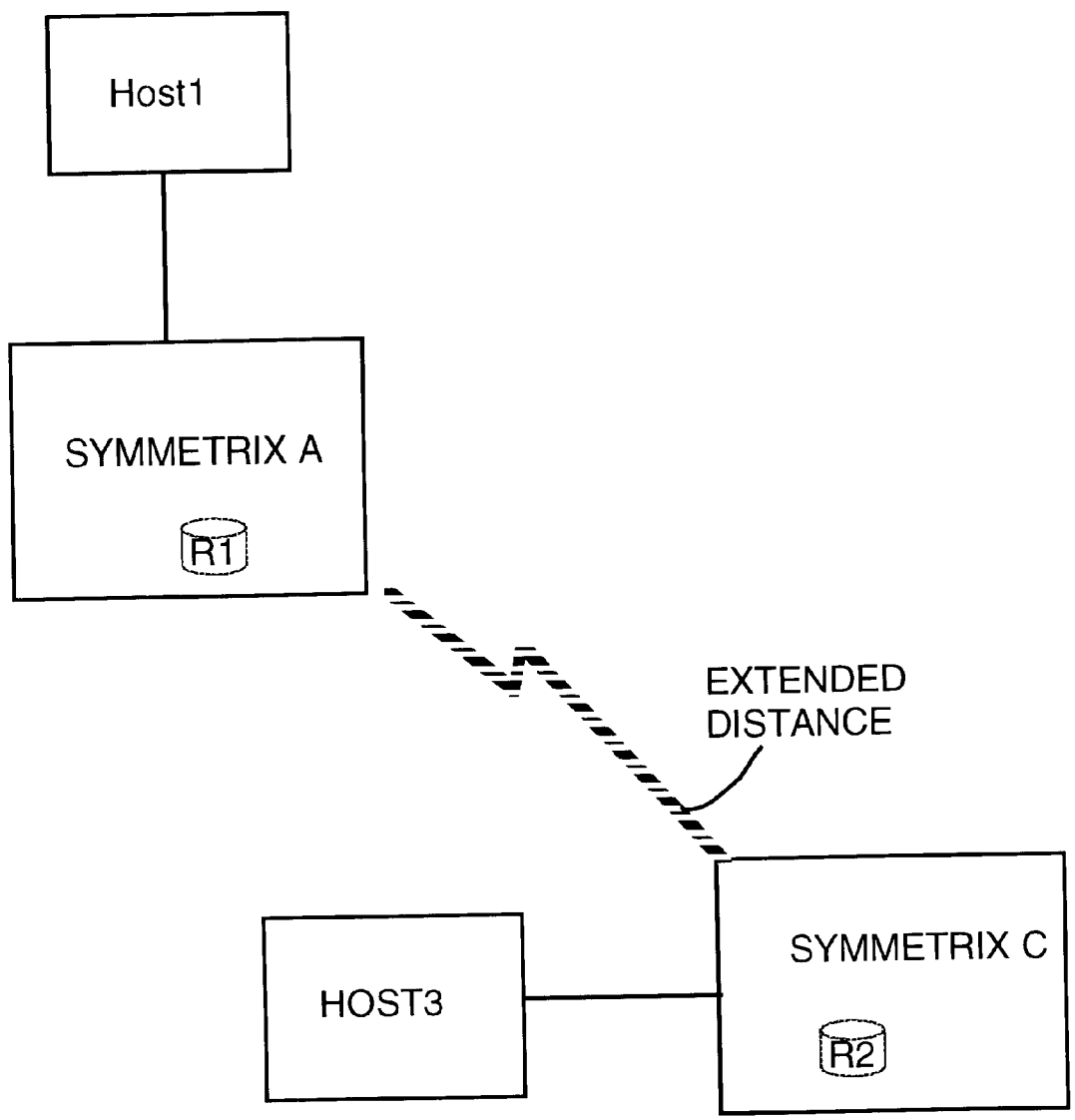
FIG. 8 (Prior Art) is a block diagram of an extended distance configuration of a SYMMETRIX™ system.

Turning briefly to FIG. 7c (Prior Art), source volumes R1 are the set of volumes labeled here as S1–S8. When the SRDF feature is activated, a remote link director RLD treats these volumes as a remote access group, here RA0. The SRDF feature links the source volumes R1 to target volumes R2 in SYMMETRIX B(SLAVE) shown here as volumes T1–T8), under the heading of remote access group RA0.

Turing back to FIG. 1, it can be seen that SYMMETRIX™ system SYMM1 contains a source volume R1 which is linked to remote SYMMETRIX™ system SYMM3, in the CAMPUS complex by SRDF over remote access group RA0. SYMMETRIX™ system SYMM2, at physical location LOCAL, contains two source volumes R1A and R1B, which are linked to SYMMETRIX™ systems SYMM4 and SYMM5 by SRDF over remote access groups RA0 and RA1. Note that in this configuration, SYMMETRIX™ system SYMM3 is referred to as remote access group 0 (RA0), in relation to SYMM1. SYMMETRIX™ system SYMM4 is referred to as remote access group 0 (RA0), in relation to SYMM2, while SYMMETRIX™ system SYMM5 is referred to as RA1, in relation to SYMM2. This latter SYMMETRIX™ system SYMM5, is, in turn, linked by SRDF over remote access group RA0 to a SYMMETRIX™ system SYMM6 at an EXTENDED location. SYMMETRIX™ system SYMM6 is therefore a remote access group RA0 to SYMMETRIX™ system SYMM5. The configuration shown in FIG. 1 is for illustrative purposes only. Other configurations are possible.

Still in FIG. 1, by use of the present invention as well as the BCV features described in co-pending applications 953 and 020, the mass storage volume SYMMETRIX™ system SYMM6 contains remotely located copies of the data on source volume R1B in SYMMETRIX™ system SYMM2. The copies residing on SYMMETRIX™ system SYMM6 may actually have been made from the intervening level source volume R1BCV in SYMMETRIX™ system SYMM5. When SRDF is used to link SYMMETRIX™ systems, each system knows its place in the chain. Thus, the present invention enables a user to establish a remote BCV volume, R1BCV in SYMM5. Heretofore, a user could only establish a BCV volume on a locally configured SYMMETRIX system. Once the remote BCV volume has been established, it becomes a mirror of the target volume R2, on SYMM5, which, in turn, by virtue of the SRDF functions, was already a mirror of the source volume R1B in SYMM2. If the user wishes to make yet another remote copy, the user uses the remote split command to split R1BCV off from target volume R2 in SYMM5, makes R1BCV a source volume R1, and, using SRDF, links it to target volume R2 in SYMM6. Thus, the data which was copied to R1BCV from R1 in SYMM2 can now be cascaded down to target volume R2 in SYMM6.

With the present invention, host component software 08 can issue a query command (a query command allows the user to get host component software 08 to determine the status of any BCV volume) with remote parameters (as shown in FIG. 5 and described above) to locate all or a specified number of the BCV volumes at the remote sites related to the logical volume in question. Since the SRDF features in the SYMMETRIX™ systems already maintain the information about the remote volumes inside the SYMMETRIX™ systems themselves, in a table such as the illustrative Table in FIG. 16, the remote parameters identify sets of remotely linked devices the user wishes to know about.

Figure 2:
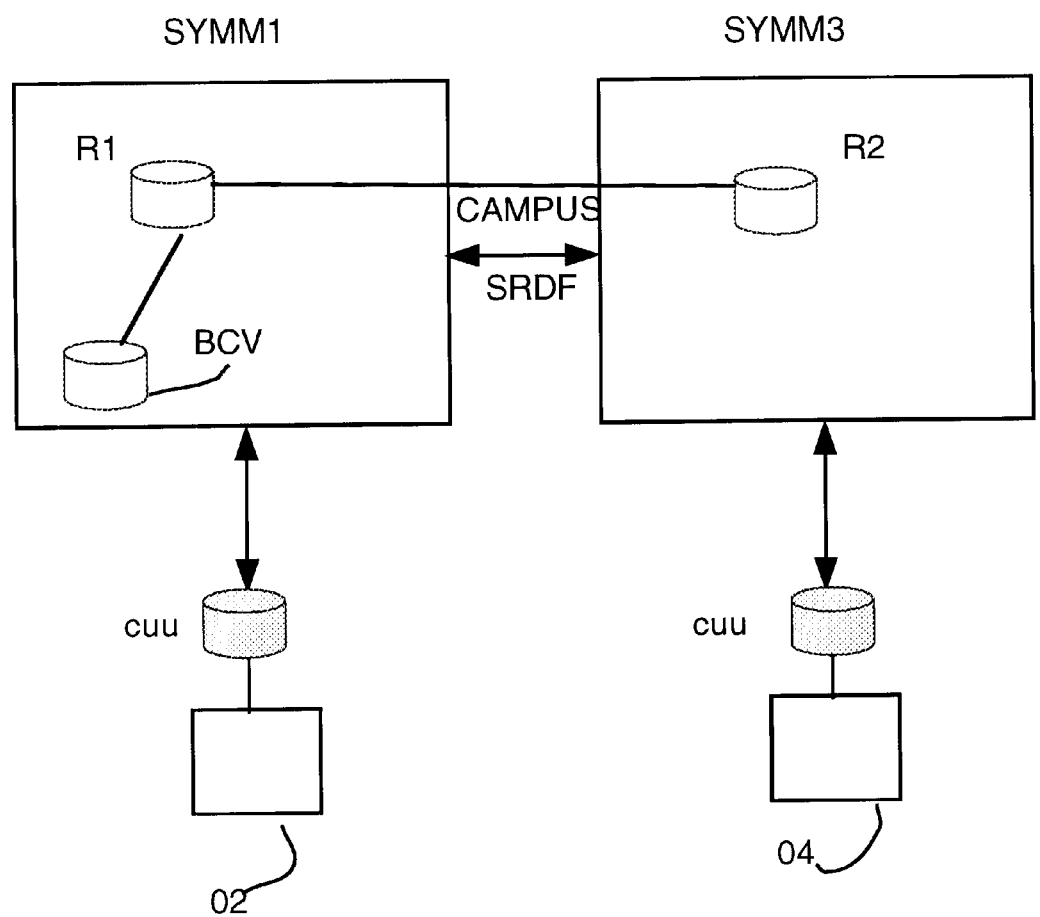
FIG. 2 is a block diagram illustrating establishment of a local business continuance volume.

FIG. 2 illustrates the way in which the BCV features operate with an SRDF source volume R1, on SYMM1 using the present invention. As seen here, an establish BCV command issued for source device R1, will result in the establishment of a BCV volume on SYMM1 of host 02. Normally, the data for the BCV volume will be copied from the source volume R1 on SYMM1, unless problems necessitate obtaining the data from the target volume R2 device in the SYMM3 device attached to host 04. If the BCV device is split from the source device, R1, this does not affect data transfers between source volume R1 and target volume R2. For restore and incremental restore commands, if the source volume R1/target volume R2 logical device link is suspended, the restore or incremental restore is only made locally to the source R1 device and the information about changed tracks is retained for later synchronization with the target volume R2.

Figure 3A:
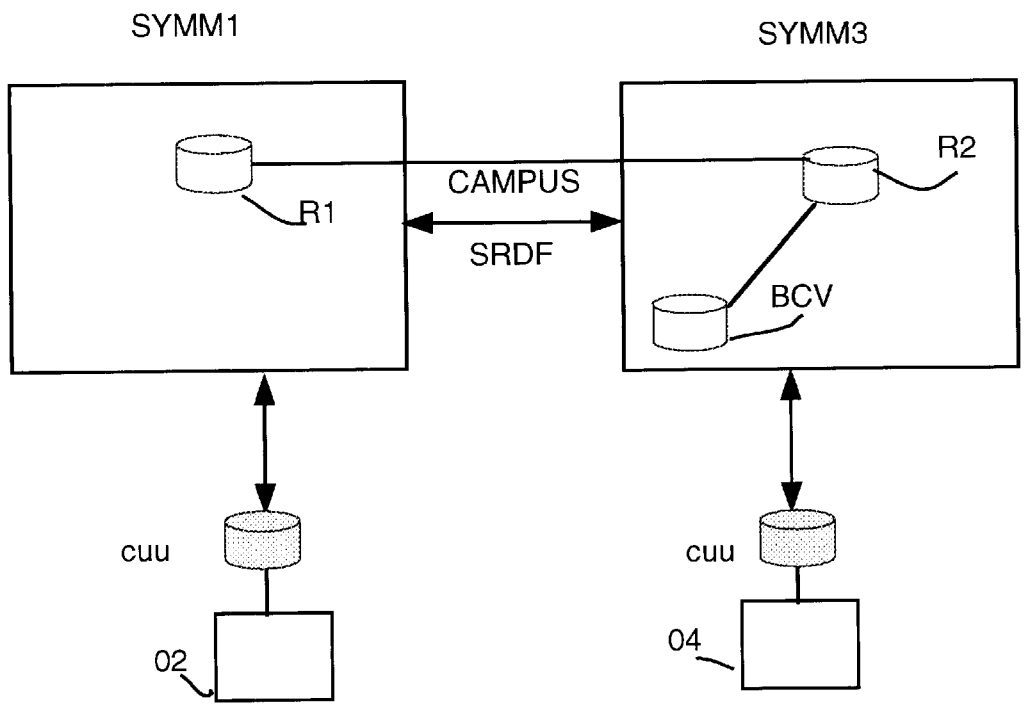
FIG. 3a is a block diagram illustrating use of the present invention with two linked sites and the establishment of a business continuance volume at a remote site.
Figure 3B:
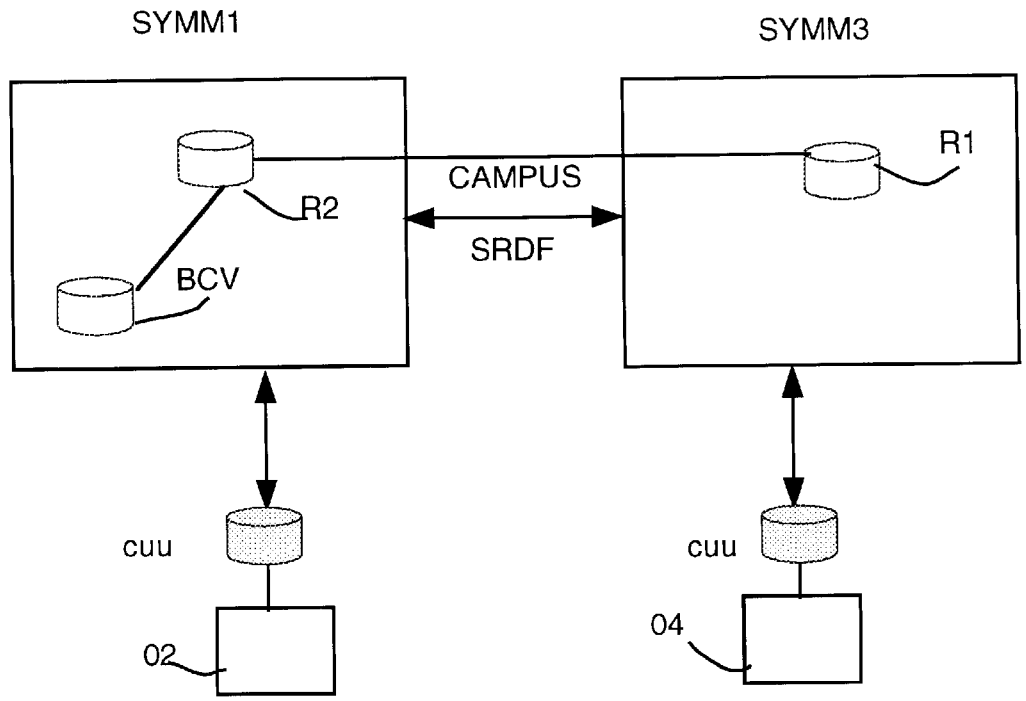
FIG. 3b is a block diagram illustrating another use of the present invention.

Turning now to FIGS. 3a and 3b, the present invention also enables BCV volume activities at remote locations to be controlled through cascading commands issued from a host 02. Establish and reestablish processes are the same as those described in application 020 if BCV devices are used in conjunction with an target volume R2 as the standard device.

Turning now to FIG. 3a, the present invention allows a user at host 02 to establish a business continuance volume BCV at a remote CAMPUS location, linked by SRDF to SYMMETRIX™ system SYMM3. In this approach, the SRDF functions have already linked source volume R1 of SYMM1 to target volume R2 of SYMM3, by assigning it as a remote mirror, thus assuring transparent copying of the contents of R1 to R2. As noted above, in the discussion of the SRDF features, this copying is done in the background by the SRDF features of SYMM3 and does not take time away from normal processing at host 02. Similarly, the copying done to create a BCV volume is also done in the background in SYMM3, using the BCV features generally described in co-pending applications 953 and 020, without taking time away from normal processing in host 02 or host 04.

The unique aspect shown in FIG. 3a is that the user can intervene at a remote SYMMETRIX™ system SYMM3, using the cascading commands of the present invention, to establish a BCV volume there. If a split command is subsequently done, the SYMMETRIX™ unit containing the target volume R2 device associated with the BCV pair locks the target volume from further updates and suspends the remotely mirrored R1 and R2 pair for a few seconds to execute the split. When the split is complete the link is restored, any changed tracks from source volume R1 are propagated to the target volume R2 for synchronization purposes. In this example, after the split, a BCV device containing a copy of the standard target volume R2 data is now available for use by host 04.

In FIG. 3b, another aspect of the present invention is shown. Since the SRDF features of SYMMETRIX™ systems can also be bidirectional, as well as unidirectional, SYMM1 can be configured by SRDF functions to contain a target volume R2, which is a remote mirror of source volume R1 in SYMM3. As host 04 updates source volume R1, in SYMM3 its contents are automatically copied by SRDF features to target volume R2 in SYMM1. In this example, the present invention enables a user at host 02, to establish a BCV volume in SYMM1 from target volume R2 in SYMM1. As mentioned above, a split command can then be used to stop the copying operation from R2 to the BCV volume, and frees up the new copy of the data on the BCV volume for other purposes, such as testing or restore operations. Effecting a split command does not affect SRDF data transfers with the target R2 device.

Now referring to FIG. 6a, an establish with remote mirrors is shown. In FIG. 6a, data volumes DV00 and DV01 are depicted as they are seen by the host. When these are established as a BCV pair, source volume BCVDV01 R1 is assigned as the next mirror (M3) to standard volume SDV00 and data from SDV00 M1 and SDV00 M2 is copied to BCVDV01 R1, synchronizing it. Since, in this example, BCVDV01 R1 is also a source volume in an SRDF link, it will be synchronized with target volume BCVDV01 R2. In many cases, a BCV pair may be split and re-established a number of times.

The present invention provides that the user may request a differential split, as shown in FIG. 6b, which splits off BCVDV01 R1 from the standard volumes, and enables copying of only the updated tracks on BCVDV01 R1 to its remote mirror BCVDV01 R2.

Figure 6C:
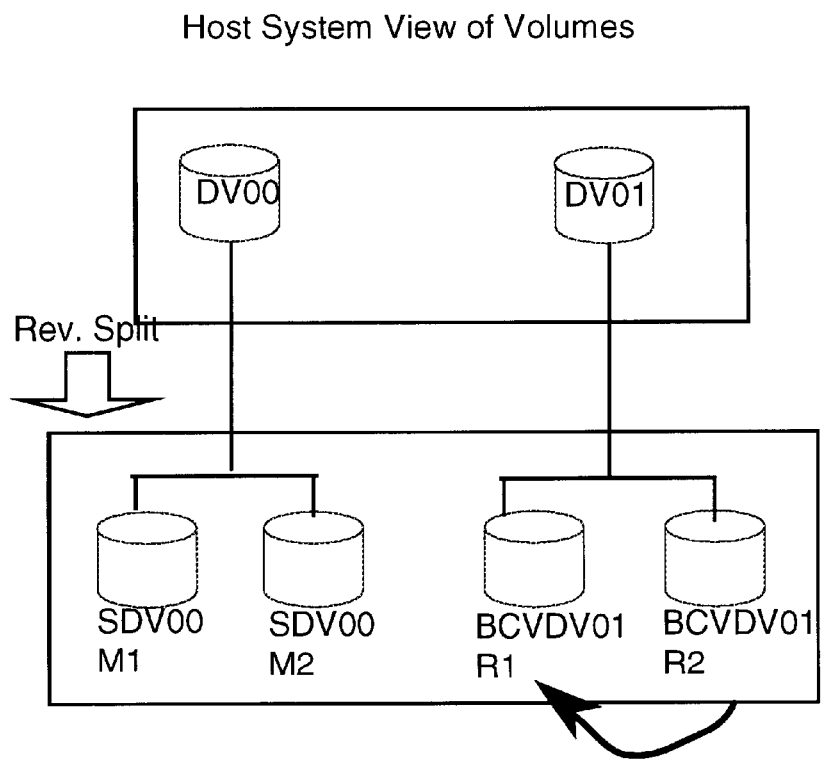
FIG. 6c is a block diagram of a reverse split command using the cascading commands of the present invention.

FIG. 6c illustrates a reverse split. A reverse split resynchronizes the BCV volume, here BCVDV01 R1 with a full data copy from its mirror—here remote target volume BCVDV01 R2. Prior to the present invention, without a reverse split command, a user could not put a BCV volume back to its original state if there had been any writes to the standard volume while the BCV volume was attached. When doing a restore, from a BCV device to a standard device no I/O commands could be sent to the standard device, since they would be propagated to the BCV device, thus destroying its integrity before the restore was complete. Heretofore, if a user wanted to preserve the data contents of the BCV device, the user had to wait for a restore to complete, and then issue a split command. When the restore completed, I/O's to the standard device could resume. Since a restore might take anywhere from 1–15 or more minutes, or might not be scheduled for hours, keeping the integrity of the data contents of the BCV device could be costly for performance of the system using the standard device. Yet, frequently, BCV devices are used to capture the status of data as of a certain day and time, so testing can be done against this copy of the real data. If the systems using the test data have bugs, it is often easier to find them by using the same data for testing until all bugs are fixed. Thus, for some applications, maintaining the integrity of the BCV data is important.

With the reverse split of the present invention, as soon as a reverse split is initiated, a user can immediately start using the standard device of the BCV pair, and send I/O operations to it. This is because the copying in a reverse split goes from the BCV device's mirror, remote mirror BCVDV01 R2 in this example, to the BCV device BCVDV01 R1, thus keeping the BCV data intact. In a reverse split, a full copy of the data is transmitted from the remote (in this example) mirror.

Figure 6D:
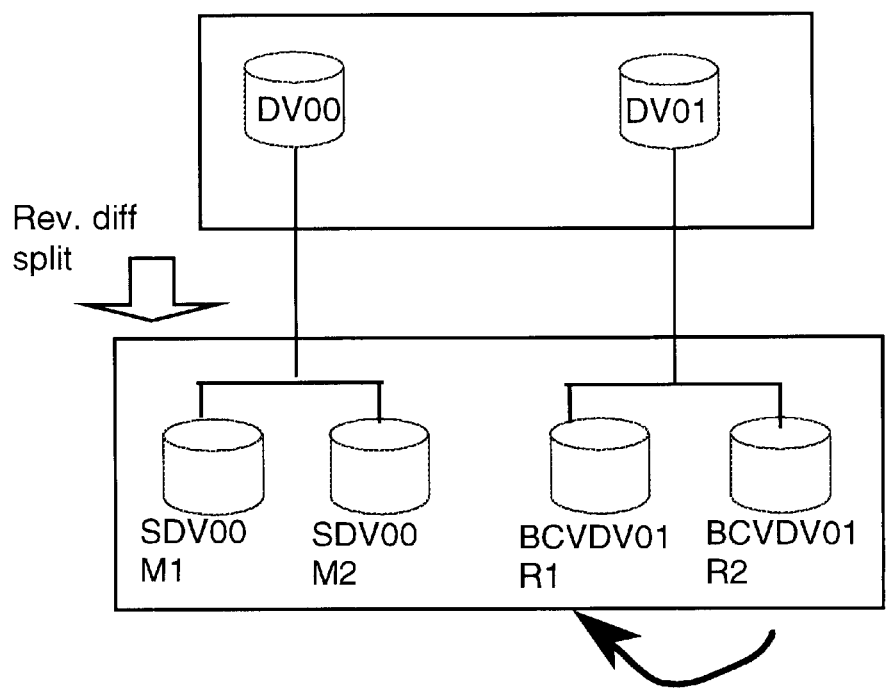
FIG. 6d is a block diagram of a reverse differential split command using the cascading commands of the present invention.

Turning now to FIG. 6d, a reverse differential split is illustrated. Here, only the out-of-sync tracks are copied (instead of a full copy) from remote mirror BCVDV01 R2 (in this example) to the BCV device BCVDV01.

Thus, the use of the reverse split and reverse differential split allows a user to keep the BCV data contents as of a certain date and time unchanged on the remote mirror (in these examples), and use them to return a changed BCV volume to the original contents of that date and time. All of this can be done without interrupting processing on the standard volumes.

Returning now to FIG. 1, it can be seen that if restore operations were the only way to restore BCV data from a remote site, such as SYMM6, the delay could be further compounded by telecommunications delays over the SRDF EXTENDED DISTANCE link. With the reverse differential split, a changed BCV volume can be brought to the status of the BCV data as of a certain date with no interruption of I/O to the standard devices.

Still in FIG. 1, SYMMETRIX™ systems capable of implementing the cascading commands of the present invention include microcode in the remote link directors and other parts of the SYMMETRIX™ system, which gives a host attached to the SYMMETRIX™ system at a source location, the ability to issue cascading BCV commands across SRDF links to devices in the SYMMETRIX™ at target locations. These cascading BCV commands are pass-through commands that travel across a link defined by an RLD as an R1/R2 pair, such as that shown in SYMM1 and SYMM2. The commands can also be passed through a configured socket device that is a member of the specified remote access (RA) group. In FIG. 1, this is exemplified at SYMM5 and SYMM6, where SRDF communications occur over a telecommunications link RA0. In FIG. 16, the microcode tables kept by each SRDF configured SYMMETRIX™ system are modified in accord with the present invention to include an additional address indicator—line1, addr—for indicating the place of this unit in a chain. This address indicator can be as simple as additional bytes to include more references, or as complex as a vector which points to other addresses.

Figure 15:
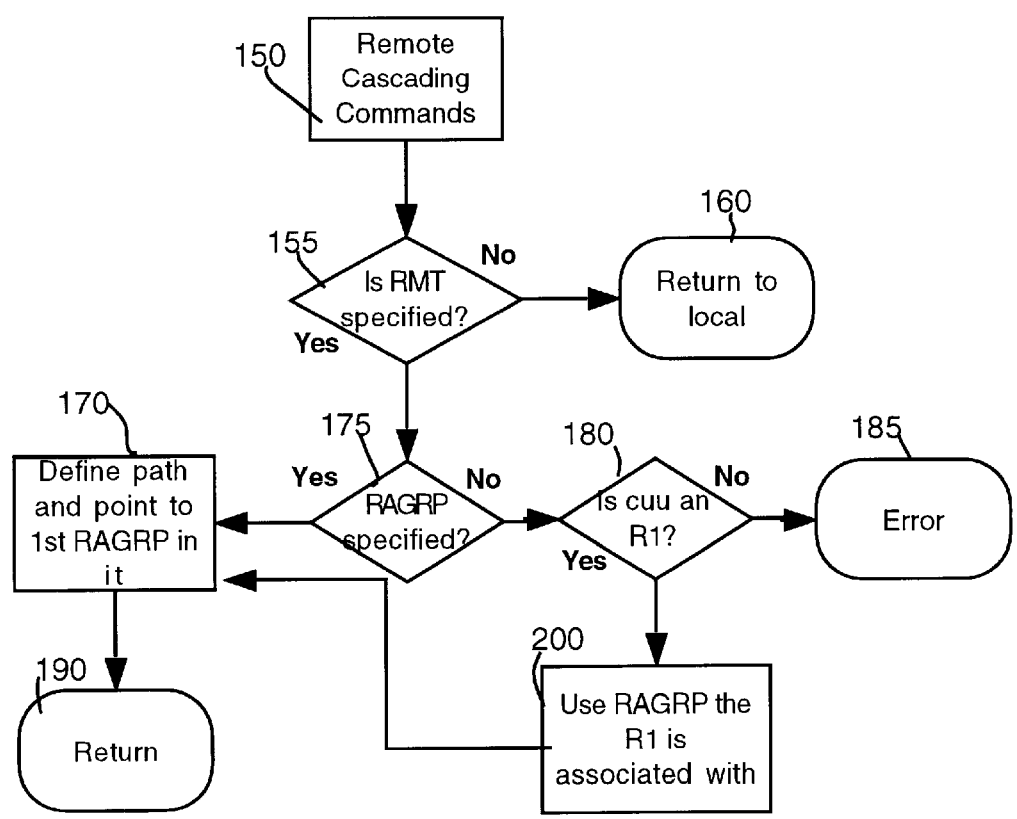
FIG. 15 is a flow diagram of the present invention.

Turning now to FIG. 15, a flow diagram of the present invention is shown. Since most of the processing for BCV volume commands, such as establish, split, query, re-establish, restore, etc., are diagrammed in application 020, referenced above, this flow diagram concentrates on the general flow followed for parsing and acting upon remote, cascading commands—block 150. At decision block 155, the present invention checks the command to see whether the RMT parameter has been specified. If it has not, local processing continues at step 160. If it has been specified, the present invention parses the command syntax (illustrated in FIGS. 4a–4e and FIG. 5) to identify the remote access group ragrp and remote devices which are the targets of the command. As noted above in the discussion of FIG. 5, this command syntax uses a simple positional remote access group number to identify the path. The invention checks at step 175 to see if an ragrp has been specified. If it has not, at step 180 the system checks to see if the device specified is a source volume, R1. If it is not, then this is an error in a remote command. If the device is an R1, the invention proceeds to step 200, and uses the ragrp number that the R1 is associated with, and proceeds to step 170. If an ragrp was specified or has been assigned as in step 200, at step 170, a path is defined and the pointer to the first ragrp link in it is indicated. At that point, the present invention returns to normal command processing. When a remote cascading command is issued, it follows the link paths defined for it by the user, and the present invention. Thus, a command can take effect several "hops" away from the local system.

While the present invention applies these cascading commands to BCV commands, those skilled in the art will appreciate that the same apparatus and method could be used for other commands designed to take effect at a distance through several intervening systems.

Those skilled in the art will appreciate that while a preferred embodiment of the present invention is directed to handling mass storage disk volumes connected to host systems, other types of writable storage media requiring remote access could also be handled by the method and apparatus of the present invention. Similarly, while the remote commands of the present system are illustrated primarily for use with business continuance volumes, those skilled in the art will appreciate that they could apply to other types of activity in a remote system setup.

In this embodiment, host component software 08's implementation of the remote control cascading commands is written in assembler language for IBM mainframes using the MVS operating system. Those skilled in the art will appreciate that it could also be written in other languages, such as C or C++, for example. Similarly, while the present invention is designed for use with the MVS operating system, those skilled in the art will appreciate that variations of it could be implemented for other operating systems such as UNIX™, NT™, and others without deviating from the spirit of the present invention.

Those skilled in the art will appreciate that the embodiments described above are illustrative only, and that other systems in the spirit of the teachings herein fall within the scope of the invention.

What is claimed is:

1. In a system comprising a local mass storage system which is linked to a host system and to a physically remote mass storage system, the physically remote mass storage system being linked to one or more other physically remote mass storage systems so as to form a stream of mass storage systems, each pair of mass storage systems being linked by a communications path and a pair of remote link directors, each of the mass storage systems comprising one of the pair of remote link directors, and each such mass storage system further comprising a cache memory, a disk adapter and one or more disk drives, a host system providing local control of mass storage volumes located on the local mass storage system and remote control of linked mass storage volumes located on any of the remote mass storage systems in the stream of mass storage systems, comprising:

a mechanism at the host system that generates and issues a user-specified command from the host system to a local mass storage system;

a selected identifier being in the command as issued from the host system, the command being recognizable by each mass storage system in the stream of mass storage systems, the selected identifier being selected from a group of identifiers, the identifiers in the group identifying the mass storage systems in the stream of mass storage systems, each mass storage system that is not identified by the selected identifier being configured to forward the command to another mass storage system, at least one mass storage system that is identified by the selected identifier being configured to execute the command after the at least one mass storage system receives the command, a plurality of user-specifiable parameters also being specifiable in the command as issued from the host system, the parameters that may be specified in the command including a first parameter, a second parameter, and one or more third parameters, the presence of the first parameter in the command indicating that the command is to be executed physically remotely from the local mass storage system, the second parameter indicating an order in which the command is to be executed, and the one or more third parameters indicating one or more paths via which the command is to be forwarded to the at least one mass storage system, the absence of the first parameter from the command indicating that the command is to be executed at the local mass storage system.

2. The host system of claim 1, further comprising host component software for processing command syntax to allow a user to specify business continuance operations to be effected on the at least one mass storage system that is identified by the selected identifier.

3. The host system of claim 2, wherein said business continuance operations comprise an establish command for causing said at least one mass storage system that is identified by the selected identifier to join a specified standard volume at a local site and a specified business continuance source volume into a business continuance pair by copying contents of said standard volume onto said business continuance source volume and a target volume mirror at the at least one mass storage system.

4. The host system of claim 3, wherein said business continuance operations further comprise a split command for causing said at least one mass storage system to separate said business continuance pair and flag a write to said standard volume and said business continuance source volume which may occur after said split.

5. The host system of claim 4, wherein said business continuance operations further comprise a reverse split command for causing said at least one mass storage system to separate said business continuance pair and copy all the contents from the business continuance volume to the associated source volume.

6. The host system of claim 4, wherein said business continuance operations further comprise a reverse differential split command for causing said at least one mass storage system to separate said business continuance pair and copy only changed contents from the business continuance target volume to the associated source volume.

7. The host system of claim 2, wherein said business continuance operations comprise a re-establish command for causing said at least one mass storage system to rejoin a standard volume and a business continuance source volume which had once been a business continuance pair into another business continuance pair, by copying to said business continuance source volume writes to said standard volume which had been flagged after a split and copying from said standard volume any data which had been changed by writes to said business continuance source volume which had been flagged after said split.

8. The host system of claim 2, wherein said business continuance operations comprise a restore command for causing said at least one mass storage system to copy contents of a business continuance source volume of a business continuance pair to a standard volume.

9. The host system of claim 2, wherein said business continuance operations comprise an incremental restore command for causing said at least one mass storage system to copy to a standard volume writes to a business continuance source volume which have been flagged since said business continuance source volume was split from a business continuance pair.

10. The host system of claim 2, wherein said business continuance operations comprise a differential split command for causing said at least one mass storage system to separate a business continuance pair and copy only changed data from the business continuance source volume to a target volume mirror.

11. In a system comprising a local mass storage system which is linked to a host system and to a physically remote mass storage system, the physically remote mass storage system being linked to one or more other physically remote mass storage systems so as to form a stream of mass storage systems, each pair of mass storage systems being linked by a communications path and a pair of remote link directors, each of the mass storage systems comprising one of the pair of remote link directors, and each such mass storage system further comprising a cache memory, a disk adapter and one or more disk drives, a method of enabling a host system to perform local control of mass storage volumes located on the local mass storage system and remote control of linked mass storage volumes located on any of the remote mass storage systems in the stream of mass storage systems comprising the steps of:

issuing a user-specified command from the host system to the local mass storage system; and placing at the host system a selected identifier in the command, the command being recognizable by each mass storage system in the stream of mass storage systems, the selected identifier being selected from a group of identifiers, the identifiers in the group identifying the mass storage systems in the stream of mass storage systems, each mass storage system that is not identified by the selected identifier being configured to forward the command to another mass storage system, at least one mass storage device that is identified by the selected identifier executing the command after the at least one mass storage system receives the command, a plurality of user-specifiable parameters also being specifiable in the command as issued from the host system, the parameters that may be specified in the command including a first parameter, a second parameter and one or more third parameters, the presence of the first parameter in the command indicating that the command is to be executed physically remotely from the local storage system, the second parameter indicating an order in which the command is to be executed, and the one or more third parameters indicating one or more paths via which the command is to be forwarded to the at least one mass storage system, the absence of the first parameter from the command indicating that the command is to be executed at the local mass storage system.

12. The method of claim 11, wherein said method further comprises the step of using host component software for processing command syntax to allow a user to specify business continuance operations to be effected on the at least one mass storage system that is identified by the selected identifier.

13. The method of claim 12, wherein said business continuance operations comprise the step of using an establish command for causing said at least one mass storage system that is identified by the selected identifier to join a specified standard volume at a local site and a specified business continuance source volume into a business continuance pair by copying contents of said standard volume onto said business continuance source volume and a target volume mirror.

14. The method of claim 13, wherein said business continuance operations further comprise the step of using a split command for causing said at least one mass storage system to separate said business continuance pair and flag a write to said standard volume and said business continuance source volume which may occur after said split.

15. The method of claim 14, wherein said business continuance operations further comprise the step of using a reestablish command for causing said at least one mass storage system to rejoin a standard volume and a business continuance source volume which had once been a business continuance pair into the business continuance pair again, by copying to said business continuance source volume said writes to said standard volume which had been flagged after said split and copying from said standard volume any data which had been changed by said writes to said business continuance source volume which had been flagged after said split.

16. The method of claim 14, wherein said business continuance operations further comprise the step of using a restore command for causing said at least one mass storage system to copy contents of a business continuance source volume of a business continuance pair to a standard volume.

17. The method of claim 14, wherein said business continuance operations further comprise the step of using an incremental restore command for causing said at least one mass storage system to copy to said standard volume said writes to said business continuance source volume which have been flagged since said business continuance source volume was split from said business continuance pair.

18. The method of claim 14, wherein said business continuance operations further comprise the step of using a differential split command for causing said at least one mass storage system to separate said business continuance pair and copy only changed data from the business continuance source volume to a target volume mirror.

19. The method of claim 14, wherein said business continuance operations further comprise the step of using a reverse split command for causing said at least one mass storage system to separate said business continuance pair and copy all the contents from a business continuance volume to an associated source volume.

20. The method of claim 14, wherein said business continuance operations further comprise the step of using a reverse differential split command for causing said at least one mass storage system to separate said business continuance pair and copy only changed contents from a business continuance target volume to an associated source volume.

* * * * *